Patented Nov. 20, 1951

2,575,511

UNITED STATES PATENT OFFICE 2,575,511

MONOPOTASSIUM PHOSPHATE PIEZO-ELECTRIC CRYSTALS

Marie Bruzau and Charles Meuleau, Paris, France, assignors to International Standard Electric Corporation, New York, N. Y., a corporation of Delaware No Drawing. Application November 22, 1948, Serial No. 61,521. In France November 21, 1947

2 Claims. (Cl. 23—300)

(Granted under the provisions of sec. 14, act of March 2, 1927; 357 O. G. 5)

The present invention relates to improvements to the patent application filed July 23, 1947, Serial No. 763,164, entitled "Piezo-Electric Crystals," by Marie Bruzau.

In the above mentioned application, a process is described relating to a method for artificial piezo-electric crystals by adding to a supersaturated crystal solution a substance which facilitates the formation of large crystals from suspended germ crystals. The addition of potassium borate to a solution of potassium phosphate was mentioned in particular.

According to features of the present invention, two substances are added to the crystal solution, namely potassium borate and potash for solutions of potassium phosphate, urea and ammonia for solutions of ammonium phosphate.

The crystals obtained according to the process of the invention can reach large dimensions, also growing larger in the transverse direction.

The above mentioned and other features and objects of this invention will become more apparent and the invention itself, though not necessarily defined by said features and object, will be best understood by reference to the following description of embodiment of the invention.

As a first example for obtaining ammonium phosphate crystals in accordance with the invention, the following proportions have been found to give favorable results:

| | | |
|---|---|---|
| Distilled water | liters | 21 |
| Ammonium phosphate | kgs | 15 |
| Ammonia 22° Beaumé | liters | 1 |
| Urea | grams | 50 |

The crystals can be obtained by progressively cooling the saturated solution to form a supersaturated solution or by a more rapid cooling combined with rotation of the crystals in the solution with periodic reversal of the direction of rotation, at short intervals.

With the above mentioned solution, it has been possible to obtain crystals of substantially prismatic shape with an increase in size in the transverse direction approximately equal to $1/50$ of the dimensional increase in the longitudinal direction.

In a second embodiment the following solution has been used for obtaining large potassium phosphate crystals:

| | | |
|---|---|---|
| Distilled water | liters | 24 |
| Monopotassium phosphate | kgs | 12 |
| Caustic potash | kg | 0.200 |
| Potassium borate | kg | 0.120 |

In this case and with the process mentioned in the above mentioned patent application, the transversal increase in size reached about $1/20$ of the increase lengthwise. It is clear that the proportions given above may be varied to some extent without substantially affecting the results achieved by the invention and without departing from the scope thereof.

While we have described particular embodiments of our invention for purposes of illustration, it should be understood that various modifications and adaptations thereof may be made within the spirit of the invention as set forth in the appended claims.

What we claim is:

1. A process for obtaining a large crystal of mono-potassium phosphate consisting in suspending a germ crystal in a supersaturated solution of mono-potassium phosphate and adding thereto caustic potash and potassium borate thereby forming a large crystal on the germ crystal by crystalization of the solution.

2. A process for obtaining large crystals of mono-potassium phosphate as in claim 1 in which the quantity of caustic potash added is approximately 0.200 kg. and the quantity of potassium borate 0.120 kg. for a solution of 12 kgs. of mono-potassium phosphate.

MARIE BRUZAU.
CHARLES MEULEAU.

REFERENCES CITED

The following references are of record in the file of this patent:

UNITED STATES PATENTS

| Number | Name | Date |
|---|---|---|
| 1,353,571 | Dreibrodt | Sept. 21, 1920 |
| 1,759,152 | Booth | May 20, 1930 |
| 2,459,869 | Christensen | Jan. 25, 1949 |
| 2,484,829 | Holden | Oct. 18, 1949 |